No. 670,168. Patented Mar. 19, 1901.
J. ZIMMERMAN & R. WIRTH.
MACHINE FOR MANUFACTURING CAN OPENING KEYS.
(Application filed Aug. 15, 1900.)
(No Model.) 9 Sheets—Sheet 9.
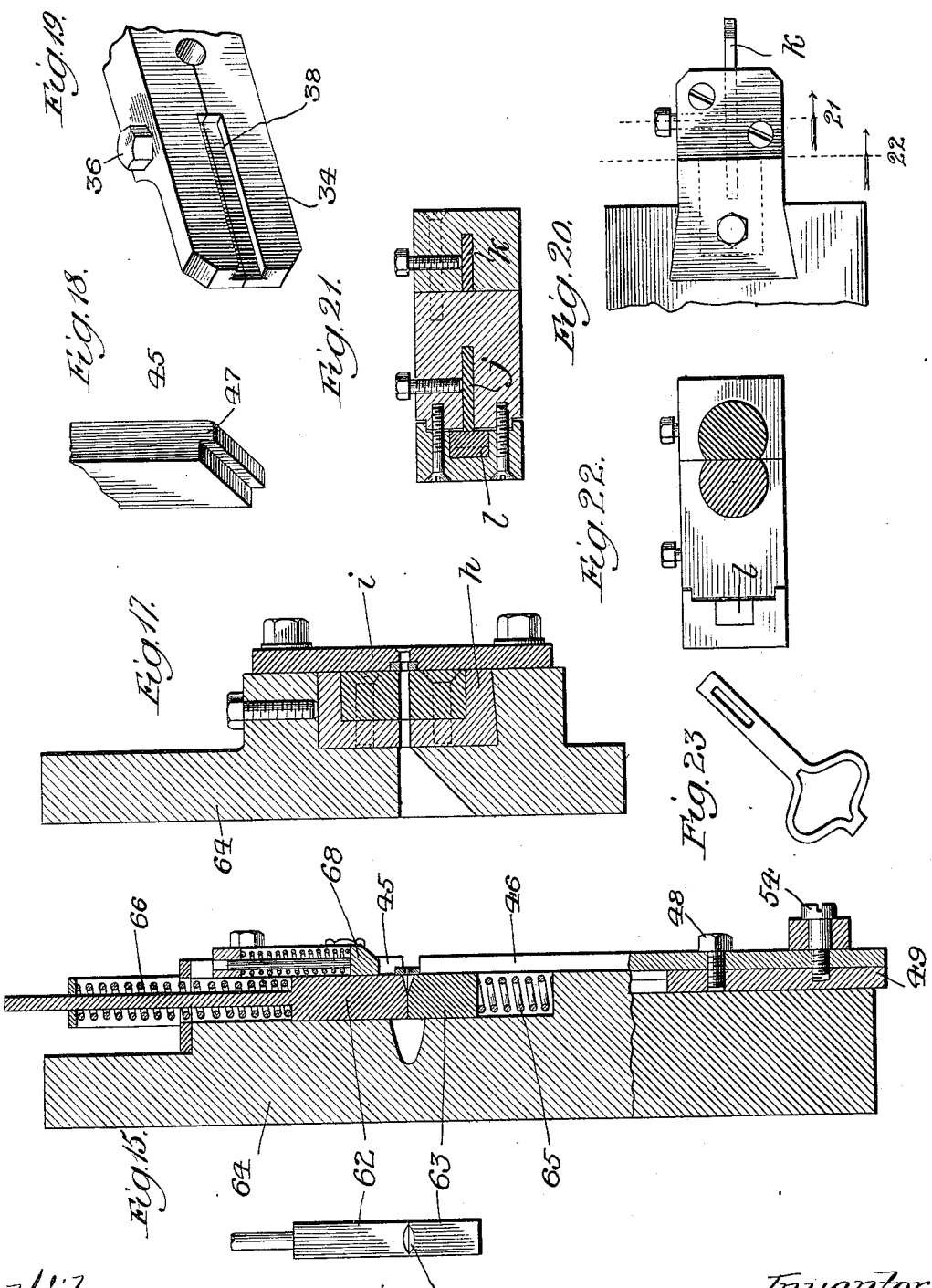

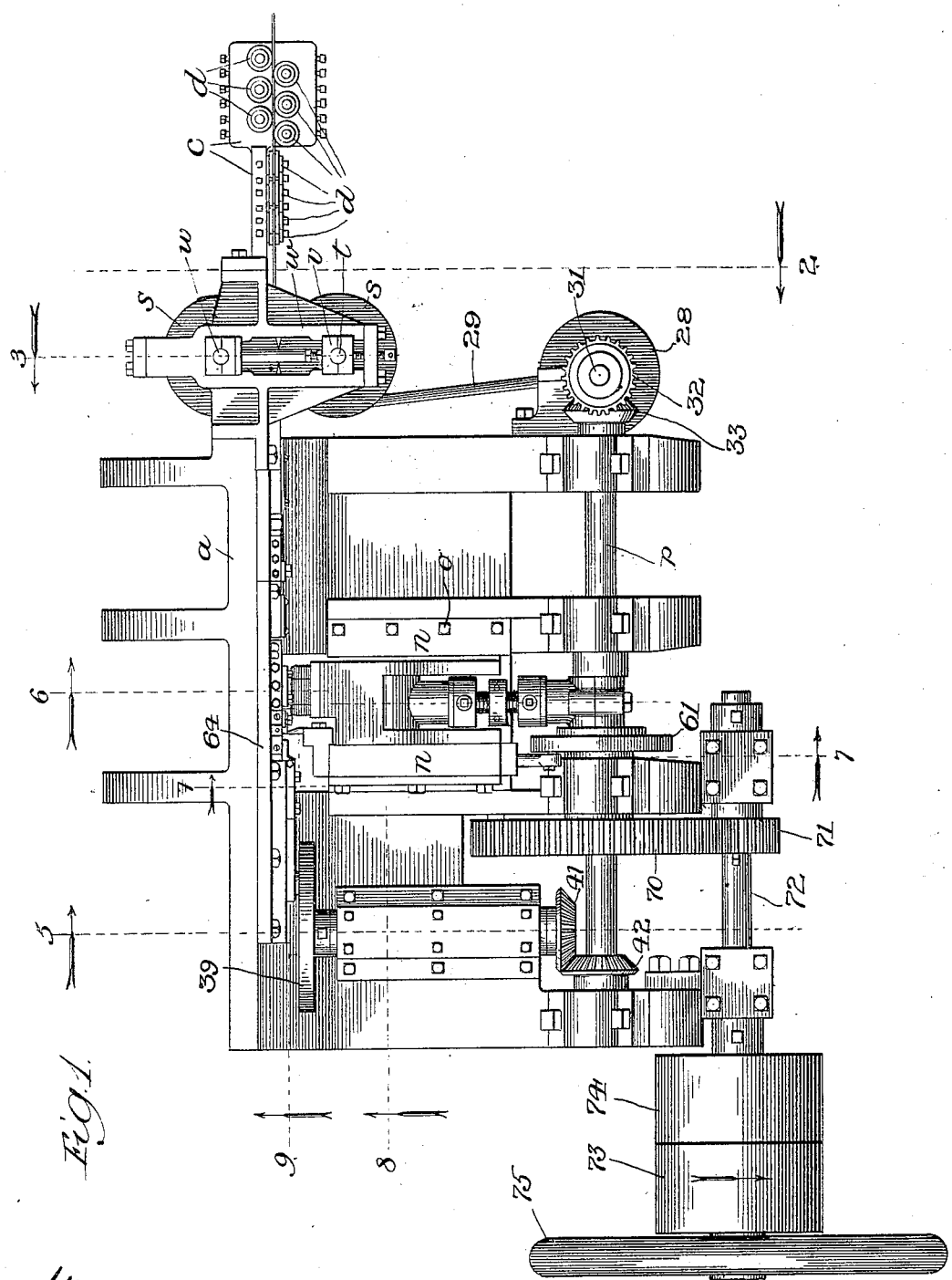

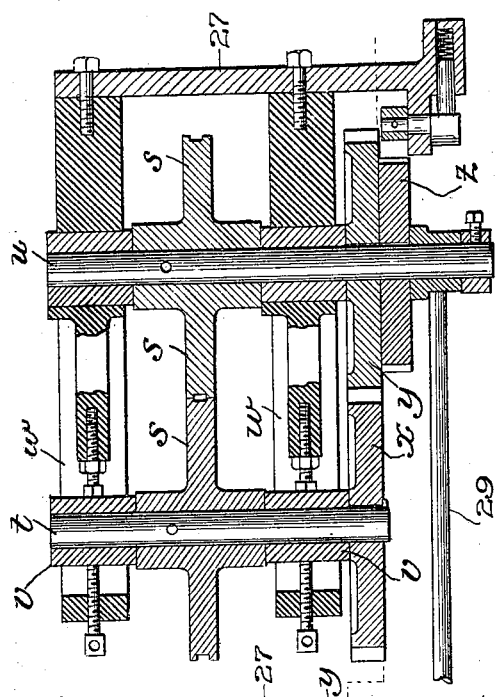

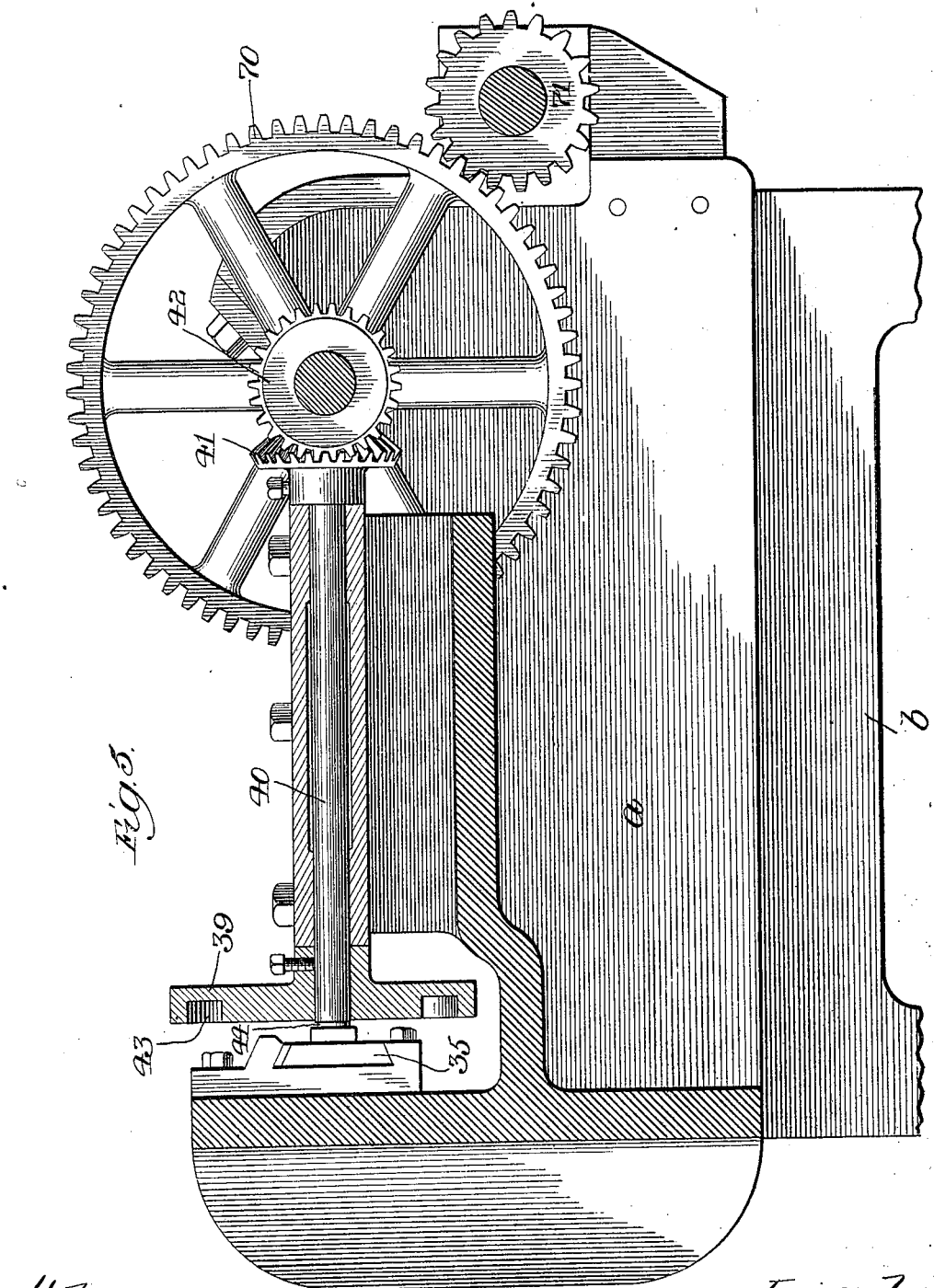

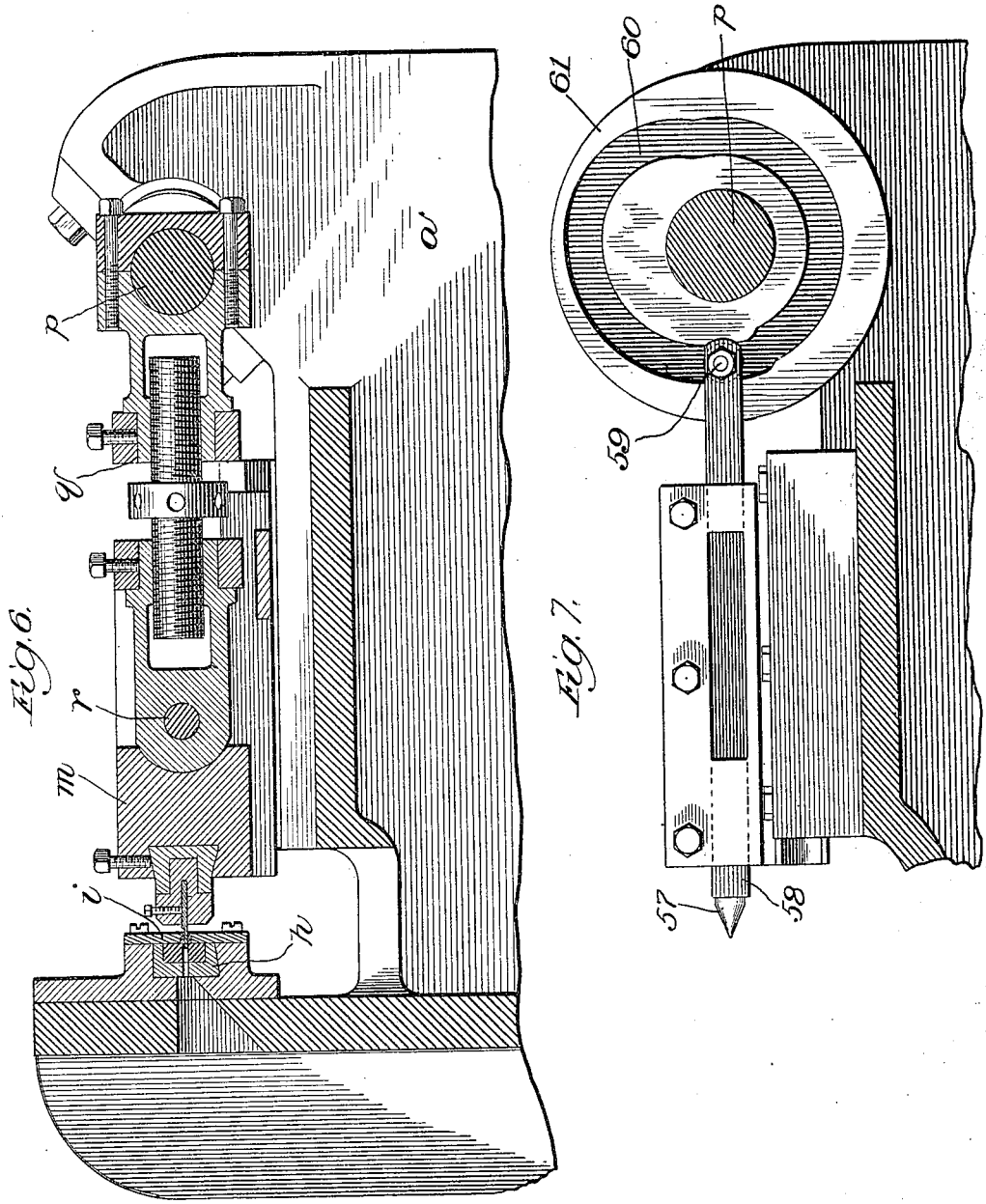

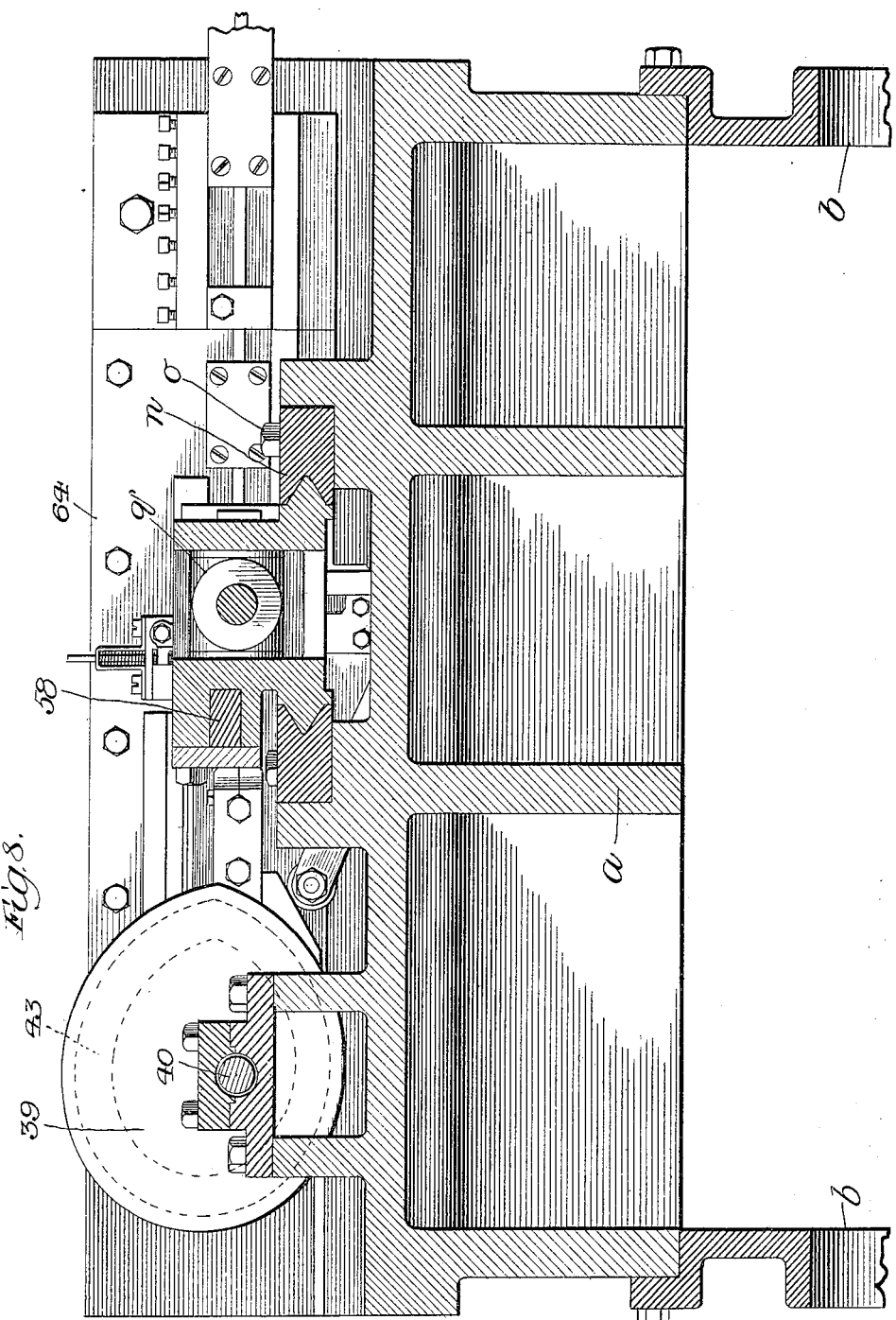

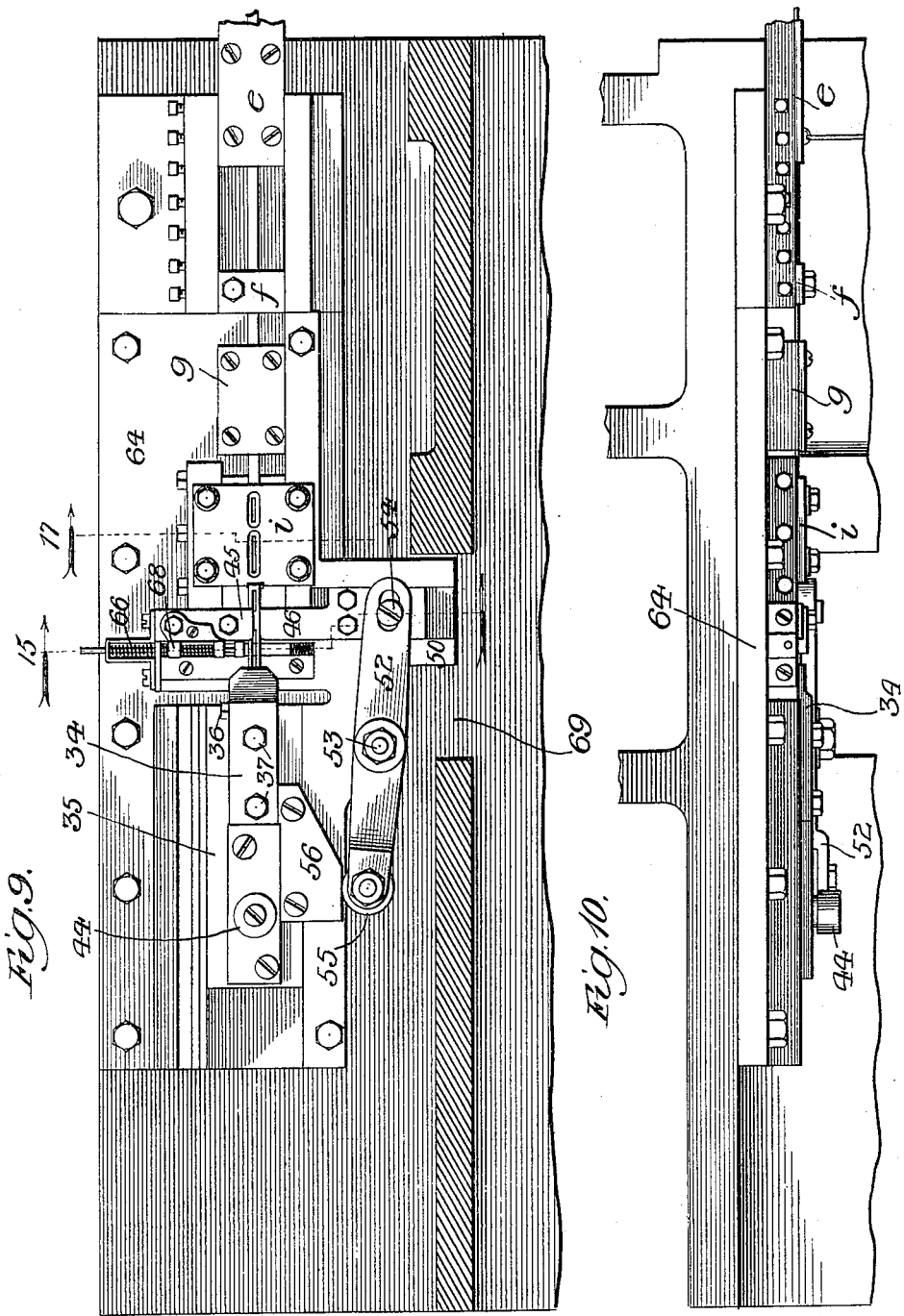

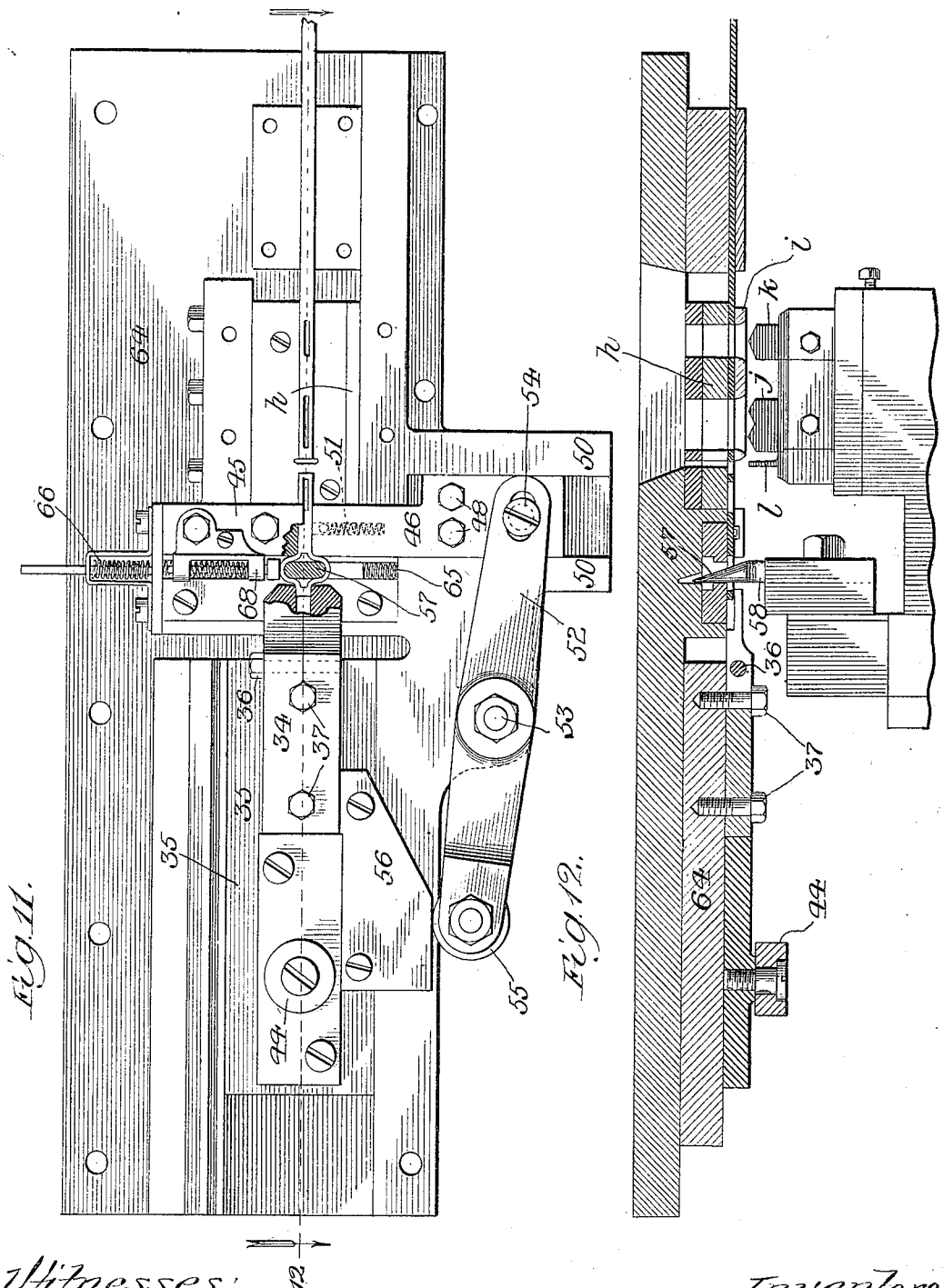

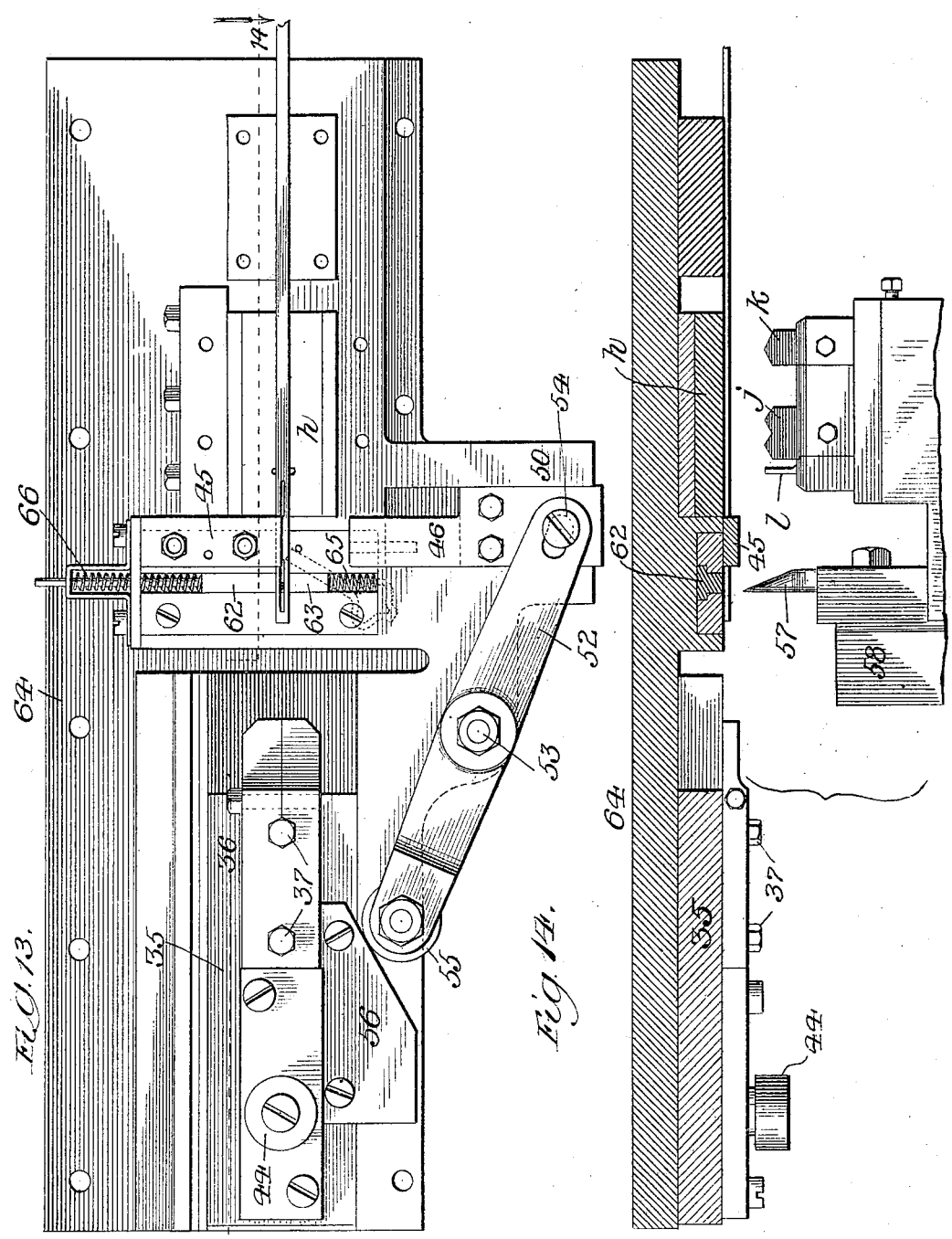

UNITED STATES PATENT OFFICE.

JOHN ZIMMERMAN AND RUDOLPH WIRTH, OF CHICAGO, ILLINOIS.

MACHINE FOR MANUFACTURING CAN-OPENING KEYS.

SPECIFICATION forming part of Letters Patent No. 670,168, dated March 19, 1901.

Application filed August 15, 1900. Serial No. 26,934. (No model.)

*To all whom it may concern:*

Be it known that we, JOHN ZIMMERMAN and RUDOLPH WIRTH, citizens of the United States, residing at Chicago, in the county of Cook and State of Illinois, have invented certain new and useful Improvements in Machines for Manufacturing Can-Opening Keys, of which the following is a specification.

The invention relates to that class of machines known as "power-presses," and particularly to the construction and arrangement of the mechanisms thereof by which keys for opening metallic cans can be simply and economically constructed, all of which will more fully hereinafter appear.

The principal object of the invention is to provide a simple, economical, and efficient machine for automatically manufacturing can-opening keys from a strip of metal wire; and the invention consists in the features, combinations, and details of construction hereinafter described and claimed.

In the accompanying drawings, Figure 1 is a plan view of a machine constructed in accordance with these improvements looking at it from the top. Fig. 2 is an end elevation of the machine looking at it from line 2 at the right of Fig. 1. Fig. 3 is an enlarged sectional elevation of a portion of the mechanism, taken on line 3 of Fig. 1 looking in the direction of the arrow. Fig. 4 is a plan sectional view of a portion of the mechanism, taken on line 4 of Fig. 2 looking in the direction of the arrow. Fig. 5 is an enlarged sectional elevation of a portion of the mechanism, taken on line 5 of Fig. 1 looking in the direction of the arrow. Fig. 6 is a sectional elevation of a portion of the mechanism, taken on line 6 of Fig. 1 looking in the direction of the arrow. Fig. 7 is a similar view taken on line 7 of Fig. 1. Fig. 8 is a longitudinal sectional elevation of a portion of the mechanism, taken on line 8 of Fig. 1 looking in the direction of the arrow. Fig. 9 is a similar view taken on line 9 of Fig. 1 looking in the direction of the arrow. Fig. 10 is a plan view of the mechanism shown in Fig. 9 looking at it from the top. Fig. 11 is an enlarged detail of a portion of the mechanism illustrated in Fig. 9, showing a completed key ready to be discharged. Fig. 12 is a longitudinal plan sectional view of the mechanism shown in Fig. 11, taken on line 12 of Fig. 11 looking in the direction of the arrow. Fig. 13 is an elevation of the mechanism shown in Fig. 11, showing the completed key in dotted outline as it is being discharged from the machine. Fig. 14 is a plan sectional view taken on line 14 of Fig. 13 looking in the direction of the arrow. Fig. 15 is an enlarged sectional elevation taken on the irregular line 15 of Fig. 9. Fig. 16 is an elevation of a portion of the mechanisms illustrated in Fig. 15 and hereinafter described. Fig. 17 is an enlarged sectional detail taken on line 17 of Fig. 9 looking in the direction of the arrow. Fig. 18 is a perspective detail of one of the rigid holding-blocks for holding the body of the key in position during the spreading operation. Fig. 19 is a perspective detail of the block for holding the loop end of the key looking at it from the inside. Fig. 20 is an end view of a portion of the mechanism shown at the lower part of Fig. 14 looking at it from the right. Fig. 21 is an enlarged sectional detail taken on lines 21 of Figs. 14 and 20 looking in the direction of the arrow. Fig. 22 is an enlarged sectional detail taken on lines 22 of Figs. 14 and 20 looking in the direction of the arrow, and Fig. 23 is a plan view of the completed key.

The can-opening key to which this invention relates is formed of soft-steel wire flattened on two sides and perforated at one end and spread so as to form the loop of the key and at the other to form the key-slot, as shown particularly in Fig. 23.

In constructing a machine to manufacture a key of this type a bed portion $a$ of the desired size, shape, and strength is provided and arranged to support the operative and other mechanisms in position for use. This bed portion is preferably provided at or near each end with legs or standards $b$, tied together by the usual cross or stay bolts, (shown in Fig. 3,) all of which is thoroughly understood by those skilled in the art.

The first step in the operation after the wire has been provided is to straighten it—that is, to remove all the kinks and curvatures in the same as it leaves the reel and before it enters the guide mechanism. To provide for this result, a straightener $c$ is provided, (shown at the right hand of Fig. 1,)

which is of the usual type—viz., a plurality of rolls $d$, arranged in such manner as to grasp and permit the wire to pass between them and, as is thoroughly understood in the art, to remove all kinks and curvatures therein and feed it to the mechanism in a substantially straight condition. The construction and arrangement of a wire-straightener of this kind are well known in the art, and as it forms no material part of this invention we deem a further or detailed description of the same herein unnecessary. As the wire leaves the straightener it is passed through guides $e$, $f$, and $g$. (Shown particularly in Figs. 9 and 10.) After it leaves these guides, which are practically the holding-guides, it is desirable to first perforate it through the flat portion, so as to permit it afterward to be spread and cut the desired length. In order to accomplish this, the wires are fed, by the mechanism hereinafter described, into contact with the die $h$, (see Figs. 6 and 12,) which has a stripper $i$ arranged above the same, so as to form a space through which the wire may be passed and at the same time prevented from being drawn outwardly by the punches as they are retracted. A set of punches $j$, $k$, and $l$ are provided, of which the punch $j$ perforates the wire in the portion to form the loop, the punch $k$ perforates the wire to form the key-slot, and the punch $l$ is the cutting-off punch, which first cuts off the end of the wire to the desired length and subsequently the completed key. These punches are mounted in a cross-head $m$ of the usual construction, and which in turn is slidingly mounted in guides $n$, adjustably secured to the bed of the machine by means of set-screws $o$. To reciprocate the cross-head, a crank-shaft $p$ is provided and journaled in suitable bearings in the bed of the machine, as shown particularly in Figs. 1, 5, and 6. An adjustable pitman $q$ of the usual construction and arrangement is rotatably mounted upon the crank-pin of the crank-shaft and pivotally connected with the cross-head guide at $r$, so that as the crank-shaft is rotated the cross-head guide, with its punches, is reciprocated or moved inwardly and outwardly to perforate and cut off the wire at the desired time or times.

After the wire has been punched or perforated, as above described, it is necessary to feed it forward one step in order to bring it into position to have its loops spread and cut off. To accomplish this result, feeding mechanism is provided, which is composed of a pair of feeding-rolls $s$, (see Figs. 1, 2, and 3,) mounted upon shafts $t$ and $u$, by which they are rotated, as hereinafter described. The shaft $t$ is mounted in movable boxes $v$, in turn slidingly mounted in ways $w$, so that such shaft may be moved inwardly or outwardly to permit the feed-rolls to get the desired grip upon the wire. These feed-rolls are grooved in their outer peripheral surfaces, as shown distinctly in Fig. 3, so that the flattened wire may be firmly gripped and fed forward without any danger of becoming disengaged from the roll. These feed-roll shafts are provided with spur-gears $x$ and $y$, engaging with each other, so that as the driving-shaft $u$ is rotated rotation is also imparted thereby to the shaft $t$. It will be understood, of course, that it is necessary that these feed-rolls should be operated only when it is necessary to feed the wire forward and should be inoperative at all other time or times, particularly at the time when the wire is being perforated, the loop spread, and the completed key cut off. In order to accomplish this result, the feed-roll shaft $u$ has mounted thereon and in rigid engagement therewith a ratchet-wheel $z$. A lever 24 is next provided and loosely mounted upon the same shaft, one end of which carries a pawl 25, engaging with the teeth of the ratchet, so that as the lever swings in one direction the ratchet-wheel, with its attached mechanisms, is rotated, but is permitted to swing in the other direction without operating the ratchet in any way whatever. A detent or dog 26 is provided, mounted upon a block 27 and also engaging the ratchet-teeth, so as to prevent such ratchet and its attached mechanism from having a backward rotation during the backward oscillations or vibrations of the lever 24.

To impart the necessary vibrations or oscillations to the lever 24, a crank-disk 28 is provided, having pivotally secured thereto at a point eccentric to its axis a connecting-rod 29, which is also pivotally secured at 30 to the oscillating lever, so that as the crank-disk is rotated, as hereinafter described, the lever is oscillated in one direction during substantially one-half its rotation and in the other direction during the remainder of the rotation of the disk, so that there is a period of time equal to one-half of the rotation of the crank-disk during which the feed-rolls are operated and a remaining period equal to one-half of the rotation of the crank-disk during which the feed-rolls and attached mechanisms remain inoperative. To operate the crank-disk, it is mounted upon a shaft 31 at the lower end thereof, the upper end of which is provided with a bevel-pinion 32, engaging a similar bevel-pinion 33 on the end of the crank-shaft, so that the rotations of such crank-disk are equal to the rotations of the crank-shaft, thereby providing for the correct timing of the feed-rolls and movements of the wire to be operated upon.

The wire having been fed forward into the position shown in Fig. 9, it is necessary to spread the loop and cut off the wire, so as to complete the key. The first step, however, is to feed the wire forward and hold the end of it, as shown particularly in Fig. 9, so that during the spreading operation the split or perforation will not be opened completely through the end of the key. To accomplish this result, a holder 34 is provided and mounted upon a sliding block 35. This holder, as shown in Figs. 11 and 19, is made in two parts secured together by means of a screw 36 and to the slide-blocks by means of screws 37. It is also grooved or slotted in the back portion at 38, of a depth and width equal to the width and thickness of the end of the key, as shown in Fig. 11, so that when it is moved forward, as shown in Figs. 9 and 11, it is in position to receive the end of the wire and hold it during the spreading operation, as shown particularly in Fig. 11, and thereby prevent the slit from extending clear through to the end and at the same time provide for the proper curve of the loop. To move this sliding block, with its attached holder, back and forth at the proper time or times, a face-cam 39 is provided (see Fig. 5) and mounted upon the inner end of a shaft 40, the outer end of which is provided with a bevel-pinion 41, engaging a similar bevel-pinion 42 upon the left-hand end of the crank-shaft, as shown particularly in Figs. 1 and 5. This face-cam is provided with a cam-groove 43, in turn engaging a trunnion or roll 44, secured to the sliding block which carries the holder. This cam-groove is of such shape (see Fig. 8) that in one portion of it the holder is permitted to remain stationary long enough for the spreading operation to be performed and at other times to move the same back or forth to remove the holder from position and permit the key to drop, as shown in Fig. 13, or forward into position to permit the loop of the key to be spread, as shown in Figs. 9 and 11. It is also desirable that the body of the key be firmly held in position during the operation of spreading and be permitted to discharge when such spreading and cutting-off operations are completed. In order to accomplish this result, a set of holders 45 and 46 is provided. The holder 45 is rigid or stationary and is provided with a downwardly-extending lip 47, while the holder 46 is reciprocated in a vertical plane and has a flat lower edge, and, as shown particularly in Fig. 15, both of such holders are arranged at right angles to the movement of the wire. The movable holder 46 is attached, by means of screws 48, to a slide 49, mounted in the ways 50, (see Figs. 11 and 15,) and is moved up and down therein—downwardly against the tension of a spring 51 and upwardly by means of a rocking lever 52, which is pivoted to the frame of the machine at 53. This rocking lever at one end contacts a screw 54 in the movable holder and at the other is provided with a roll 55, which contacts an inclined cam 56 on the slide 35, so constructed and arranged that as the sliding block is moved forward with its holder to grasp the loop end of the key the vibrating lever is operated to move the holder 46 upwardly and force the body of the key against the rigid holder 45, and thus firmly hold the key in position during the spreading operation.

In order to spread the perforated end of the key which forms the loop, a spreader 57 is provided and mounted in the end of a sliding block 58, as shown particularly in Figs. 7 and 14, which in turn is slidingly mounted in the cross-head, as shown in Fig. 8. It is desirable, however, that the motions of this spreader-slide be independent of the motions of the cross-head and that it be moved backward and forward at the proper time. In order to accomplish this result, this spreader-slide is slidingly mounted in the cross-head, as above suggested, and has its outer end provided with a pin 59, engaging with a cam-groove 60 of a face-cam 61. This face-cam is mounted upon the crank-shaft so as to rotate therewith, and its cam-groove is of such shape and construction, as seen clearly in Fig. 7, as to permit the spreader-slide to be moved forward at such time or times as to enter the perforation and spread the loop of the key, as shown clearly in Figs. 11 and 12.

It is desirable that some means be provided by which a backing may be furnished for the wire which forms the loop as such loop is spread and at the same time permit the spreader to pass through the loop. In order to accomplish this result, two backing-blocks 62 and 63 are provided and slidingly mounted in the holder 64, which also holds the body-holder 45 in position. (See Figs. 11, 12, and 15.) These backing-blocks are so arranged that they meet substantially at the center of the perforation in the key and are normally held in such position by means of the helical springs 65 and 66. They are also beveled at 67 to permit the end of the spreader to be inserted between them and separate them as it continues its insertion, while at the same time, as clearly seen in Fig. 15, furnishing a back for the wire portion of the loop and preventing it from being distorted or twisted. As the loop is formed, its wire contacts a discharging-plunger 68, as shown in Figs. 11 and 15, so that when such spreader is removed, the key cut off, and movable block retracted, as shown in Fig. 13, this discharging-plunger forces the key out of position and permits it to drop down onto the bed of the machine, where it may pass through the opening 69 and be caught in any desired box or receptacle.

To furnish sufficient power for driving the crank-shaft, such shaft is provided with a large spur-gear 70, engaging with a driving-pinion 71 on a driving-shaft 72, which latter shaft is provided with tight and loose pulleys 73 and 74 and with a balance-wheel 75, all of which is understood by those skilled in the art and which transmit the desired power and motion to and through the crank-shaft for all the other mechanisms.

While we have described our invention with more or less minuteness as regards details of construction and arrangement and as being embodied in certain precise forms, it will be understood that we do not desire to be limited thereto unduly or any more than is pointed out in the claims. On the contrary, we contemplate all proper changes in form, construction, and arrangement, the omission of immaterial elements and the substitution of equivalents, as circumstances may suggest or necessity render expedient.

We claim—

1. In a machine of the class described, the combination of means for holding a strip of wire in the machine, means for perforating it at at least two points, and means for spreading it at one of the perforations to form a key, substantially as described.

2. In a machine of the class described, the combination of means for holding the wire in the machine, means for perforating it at two points and cutting off the end, means for spreading it at one end to form a loop, and means for holding the wire at the loop end to prevent disruption thereof, substantially as described.

3. In a machine of the class described, the combination of means for holding a piece of wire in the machine, punch-and-die mechanism operatively mounted in the machine to perforate the wire at two points, means for moving the wire a step forward, means for spreading one end of the wire, and means for cutting off the completed key, substantially as described.

4. In a machine of the class described, the combination of means for holding the wire in the machine in position to be perforated, means for perforating the wire at two points, mechanism for feeding the wire in a step to present a blank piece for perforation and the perforated portion for spreading, means for spreading one end of the wire to form a loop, means for holding the looped end of the wire to prevent disruption, and a cut-off punch arranged to cut off the completed key, substantially as described.

5. In a machine of the class described, the combination of punch-and-die mechanism for perforating the wire at two points to form a loop and a key-slot, a rigid and a movable block for holding the body of the key-blank in position while the spreading operation is performed and permitting it to be discharged when such operation is completed, a slotted block arranged to move in line with the wire to hold the loop end of the key and permit it to be spread without disrupting the entire end of the key, a spreading-tool arranged to be moved forwardly and backwardly and spread the loop end of the key, a cut-off punch arranged to be operated at the desired time to cut off the completed key, and means for moving the holding-blocks into and out of position to hold the wire and permit the key to be discharged, substantially as described.

6. In a machine of the class described, the combination of means for feeding the wire into the machine in position to be operated upon, punch-and-die mechanism for perforating the wire at two points to form a loop and a key-slot, mechanism arranged to operate the feeding means so as to feed the wire in at the desired times to move the perforated part into position to be spread and cut off and the blank part into position to be punched or perforated, a rigid and a movable block for holding the body of the key-blank in position while the spreading operation is performed and permitting it to be discharged when such operation is completed, a slotted block arranged to move in line with the wire to hold the loop end of the key and permit it to be spread without disrupting the entire end of the key, a spreading-tool arranged to be moved forwardly and backwardly and spread the loop end of the key, a cut-off punch arranged to be operated at the desired time to cut off the completed key, and means for moving the holding-blocks into and out of position to hold the wire and permit the key to be discharged, substantially as described.

7. In a machine of the class described, the combination of punch-and-die mechanism for perforating the key, a cut-off punch for cutting off the completed key, a cross-head upon which these punches are mounted and with which they are moved back and forth, a spreading-tool, a slide upon which such spreading-tool is mounted slidingly mounted in the cross-head, a rigid holding-block against which the body of the key-blank can be pressed, a movable holding-block arranged in line therewith and adapted to be moved into and out of position to hold the body of the key-blank against the rigid holder, a holder mounted upon a slide arranged to move in line with the wire, mechanism arranged to be operated by this last-named longitudinal movable slide to operate the movable body-holder, and a crank-shaft for operating the punching, cut-off and spreading mechanism, substantially as described.

8. In a machine of the class described, the combination of means for moving a strip of wire into position to be perforated and spread, punch-and-die mechanism for perforating the key, a cut-off punch for cutting off the completed key, a cross-head upon which these punches are mounted and with which they are moved back and forth, a spreading-tool, a slide upon which such spreading-tool is mounted slidingly mounted in the cross-head, a rigid holding-block against which the body of the key-blank can be pressed, a movable holding-block arranged in line therewith and adapted to be moved into and out of position to hold the body of the key-blank against the rigid holder, a holder mounted upon a slide arranged to move in line with the wire, mechanism arranged to be operated by this last-named longitudinal movable slide to operate the movable body-holder, and a crank-shaft for operating the punching, cut-off and spreading mechanism, substantially as described.

9. In a machine of the class described, the combination of means for moving a strip of wire into position to be perforated and spread, punch-and-die mechanism for perforating the wire to form a key-slot and a loop, a cut-off punch for cutting off the completed key, a cross-head in which these punches are mounted and with which they are moved back and forth, a spreading-tool arranged to be inserted in one of the perforations and spread the same to form a loop, a slide to which this spreading-tool is affixed slidingly mounted in the cross-head, a rigid block secured to the bed of the machine against which the body of the key-blank may be held during the operation of spreading and arranged at right angles to the length of the wire, a movable holding-block in line with a rigid holding-block and arranged to be moved back and forth to hold and release the wire, a holder mounted upon a slide, in turn movably mounted on the bed of the machine in line with the wire and grooved or slotted to hold the loop end of the wire and prevent the disruption of the same during the operation of spreading, cam-and-lever mechanism connecting the movable body-holder and longitudinal loop-holder together, whereby the movements of the latter serve to operate the former, a crank-shaft for operating the cross-head, a cam upon the cross-shaft contacting with and operating the spreader-slide, and a second cam arranged to be operated by the crank-shaft engaging with a longitudinal loop-holder to operate the same, substantially as described.

10. In a machine of the class described, the combination of means for feeding the wire into position to be perforated and spread, punch-and-die mechanism for perforating the wire, a cut-off punch for cutting off the completed key, a cross-head in which these punches are mounted and with which they are moved back and forth, a spreader arranged to be inserted in one of the perforations and spread the same so as to form a loop, a slide to which this spreader is attached slidingly mounted in the cross-head, a rigid holding-block secured to the bed of the machine at right angles to the movement of the wire to hold the body of the key-blank in position during the operation of spreading, a movable block arranged in line therewith to hold the body of the wire against the same and release it at the proper time or times, a longitudinally-movable block arranged to move lengthwise of the wire and grooved or perforated to hold the looped end of the key-blank during the operation of spreading and prevent the disruption thereof, a vibrating lever secured to the bed of the machine and contacting the movable body-holder, a cam secured to the loop-holder arranged to operate the vibrating lever and thereby the movable holder, two backing-blocks movably mounted in the bed of the machine and meeting at a point midway of the loop-perforation of the key-blank and adapted to be separated by the action of the spreader and furnish a back for the loop during the operation of spreading, spring mechanism for normally holding the backing-blocks in position, a crank-shaft, a pitman connecting the crank and cross-head together, a face-cam mounted on the crank-shaft having its cam-groove connecting with the spreader-slide to operate the same, a second face-cam mounted upon a shaft arranged at right angles to the crank-shaft and provided with a cam-groove engaging with the loop-holder, and gear mechanism connecting the last-named shaft with the crank-shaft, substantially as described.

11. In a machine of the class described, the combination of means for feeding the wire into position to be perforated and spread, punch-and-die mechanism for perforating the wire, a cut-off punch for cutting off the completed key, a cross-head in which these punches are mounted and with which they are moved back and forth, a spreader arranged to be inserted in one of the perforations of the key-blank and spread the same so as to form a loop, a slide to which this spreader is attached slidingly mounted in the cross-head, a rigid holding-block secured to the bed of the machine at right angles to the movement of the wire to hold the body of the key-blank in position during the operation of spreading, a movable block arranged in line therewith to hold the body of the wire against the same and release it at the proper time or times, a longitudinally-movable block arranged to move lengthwise of the wire during the operation of spreading and prevent the disruption thereof, a vibrating lever secured to the bed of the machine and containing the movable body-holder, a cam secured to the loop-holder slide and arranged to operate the vibrating lever and thereby the movable body-holder, two backing-blocks movably mounted in the bed of the machine and meeting at a point midway of the loop-perforation and adapted to be separated by the action of the spreader and furnish a back for the loop during the operation of spreading, spring mechanism for normally holding the backing-blocks in position, a crank-shaft, a pitman connecting the crank of the crank-shaft and cross-head together, a face-cam mounted on the crank-shaft having its cam-groove connecting with the spreader-slide to operate the same, a second face-cam mounted upon a shaft arranged at right angles to the crank-shaft and provided with a cam-groove engaging with the loop-holder, gear mechanism connecting the last-named shaft with the crank-shaft, and a discharging-plunger arranged to be contacted by the completed loop and when the holders are removed to assist in discharging the completed key, substantially as described.

JOHN ZIMMERMAN.
RUDOLPH WIRTH.

Witnesses:
HARRY IRWIN CROMER,
THOMAS F. SHERIDAN.